Nov. 3, 1925.
J. M. ANGELETTI
1,560,013
MEASURING STOPPER FOR CONTAINERS
Filed Aug. 14, 1923
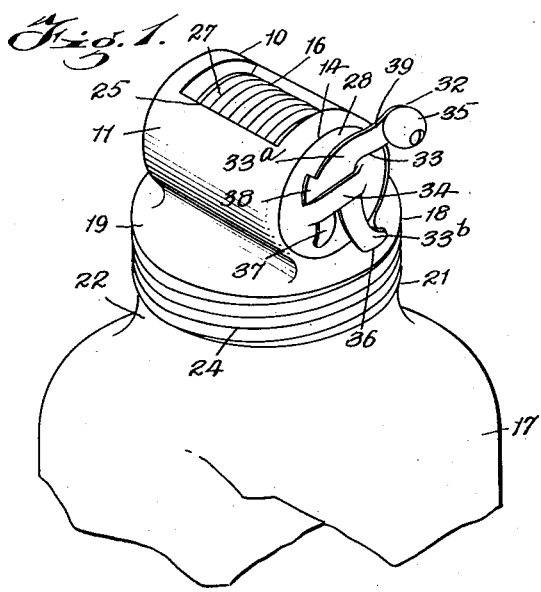
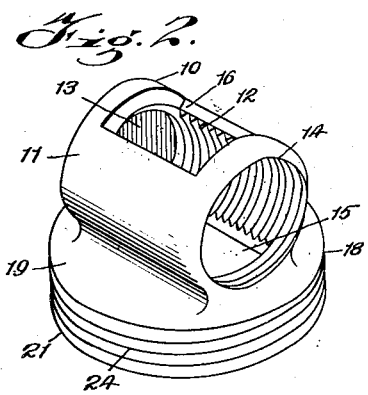
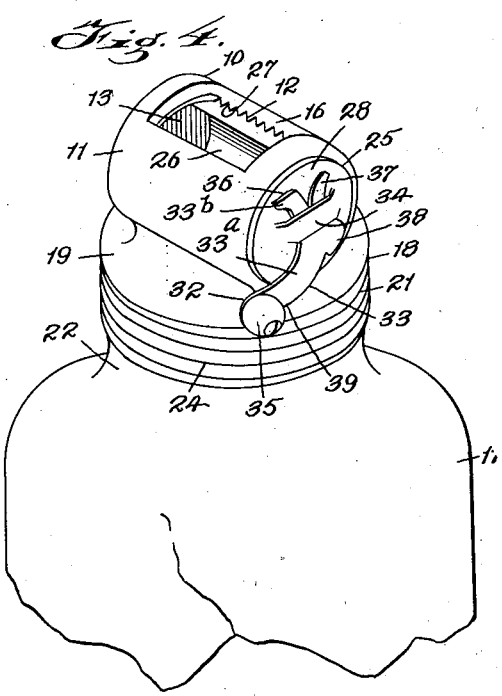
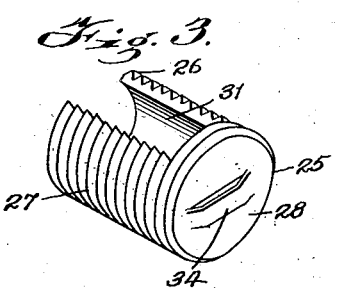
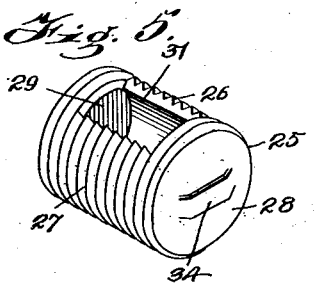
INVENTOR
Joseph M. Angeletti
BY
W. T. Criswell
ATTORNEY Patented Nov. 3, 1925.

1,560,013

UNITED STATES PATENT OFFICE.

JOSEPH M. ANGELETTI, OF NEW YORK, N. Y.

MEASURING STOPPER FOR CONTAINERS.

Application filed August 14, 1923. Serial No. 657,412.

*To all whom it may concern:*

Be it known that I, JOSEPH M. ANGELETTI, a subject of the King of Italy, and a resident of New York, in the county of New York and State of New York, have invented certain new and useful Improvements in a Measuring Stopper for Containers, of which the following is a full, clear, and exact specification.

This invention relates more particularly to a class of evacuating devices.

My invention has for its object primarily to provide a device or stopper designed to be employed on bottles, jars, canisters and other containers for permitting the contents thereof to be dispensed in determined quantities by being adapted to allow each desired portion of the contents to be measured so that mistakes in dispensing may be avoided, and which is of a form enabling the mouth of the container to be kept closed from exposure to air and dust in that the device and container are not required to be separated during the dispensing and measuring process. The invention consists essentially of an outer chamber with an interiorly threaded cylindrical wall having an inlet and an outlet as well as having a wall closing one of its ends, and on the wall is provided means for mounting the chamber on a container so that the passageway of its mouth will communicate with the inlet of the chamber. An inner chamber with an exteriorly threaded cylindrical wall is screwed in the outer chamber. The cylindrical wall of the inner chamber has an opening registrable alternately with the inlet and outlet of the outer chamber when the inner chamber is partly rotated, and one or both ends of the inner chamber may be closed by one or two walls. The inner chamber is preferably of proportions for holding a determined quantity of the contents of the container, and this chamber is normally positioned with its opening in register with the inlet of the outer chamber so that the mouth of the chamber will be closed against admitting air or dust. With the tilting of the container the desired quantity of its contents will pass into the inner chamber, and when the inner chamber is rotated for registering its opening with the outlet of the outer chamber the contents may then be dispensed.

A further object of the invention is to provide a measuring stopper for containers of a simple, efficient and durable contruction which may be made of suitable material in any appropriate size.

With these and other objects in view, the invention will be hereinafter more fully explained with reference to the accompanying drawing forming a part of the specification in which similar characters of reference indicate corresponding parts in all the views, and will then be pointed out in the claims at the end of the description.

In the drawing, Figure 1 is a fragmentary view showing an elevation of a container with one form of my improved measuring stopper applied thereto, the inner chamber of the device being in a closed position.

Fig. 2 is a perspective view of the outer chamber of the device.

Fig. 3 is a perspective view of the inner chamber of the device with the handle removed therefrom.

Fig. 4 is a perspective view of the device showing the inner chamber in an open position, and Fig. 5 is a perspective view of a slightly modified form of the inner chamber.

The device or measuring stopper has an outer chamber or casing 10 which may be of any appropriate size, and this chamber has a cylindrical wall 11 which is interiorly threaded, as at 12. One of the ends of the wall of the chamber may be closed by a wall, as 13, to provide an open end or entrance 14. In the central part of the wall 11 is an opening or inlet 15 of a suitable size, and in the opposite part of the wall is an opening or outlet 16.

Serving as means to permit the outer chamber 10 to be removably or stationarily applied to a bottle, jar, canister or other container, as 17, a cap 18 is provided. This cap is preferably of a form having a circular top plate 19, and the inlet 16 of the wall 11 of the chamber 10 leads through the central part of this top plate. The chamber 10 is formed on the plate 19 so that the chamber is disposed lengthwise across the cap. The length of the outer chamber is such that its entrance end 14 is slightly spaced from the adjacent edge portion of the plate 19 of the cap, and on the outer edge of the plate may be a depending annular flange 21. When the container 17 is of a form having the neck of its mouth 22 exteriorly threaded the flange 21 of the cap may be interiorly threaded as at 24, to allow the cap to be removably screwed on the neck of the container, or the cap may be suitably fixed to the neck.

Within the outer chamber 10 is a rotatably adjustable inner chamber or casing 25 having a cylindrical wall 26 which is exteriorly threaded, as at 27. The diameter of the wall 26 is such that the inner chamber is screwed in the threaded wall 11 of the outer chamber, and these cylindrical walls of both chambers may be of approximately similar lengths. In the form of the inner chamber, shown in Figs. 1, 2, 3, 4, one end of the cylindrical wall 26 is closed by a wall 28, and the other end of the wall is open. In the form of the inner chamber, illustrated in Fig. 5, both ends of the cylindrical wall 26 are closed, the end opposite to the wall 28 being closed by a wall 29. When either form of the inner chamber is used the end wall 28 is at the entrance 14 of the outer chamber. In part of the threaded wall 26 of the inner chamber is an opening 31 disposed so that it is alternately registrable with the inlet 15 and with the outlet 16 of the outer chamber 10 when the inner chamber is partly rotated accordingly.

On the exterior of the end wall 28 of the inner chamber is a handle 32 to permit the inner chamber to be manually adjusted rotatively. This handle may be of any suitable form though the handle illustrated has a bar, as 33, of somewhat an L-shape to provide an arm 33$^a$ and an angularly disposed arm or finger, 33$^b$. The arm 33$^b$ of the handle at its intersection with the arm 33$^a$ may be strapped, as at 34, or otherwise fixed to or detachably fastened to the center of the end wall 28 of the inner chamber. On the free end of the arm 33$^a$ of the bar 33 is a knob or head 35, and the arm 33$^b$ is of a length so that its free end serves as a stop 36 by contacting with the plate 19 of the cap 18, when the inner chamber and handle are in the positions, shown in Fig. 1. Protruding downwardly from the lower edge of the arms 33$^b$ as well as being disposed through the strap 34 is a clip or finger 37 which is bent into engagement with part of the lower edge of the strap for holding the handle in the strap, and projecting downwardly from the arm 33$^a$ of the bar 33 is a lug or pointer, as 38, to indicate that the handle should be swung from left to right and reversely for rotatably adjusting the inner chamber. The arm 33$^a$ is also of a length so that its part, as 39, adjacent the knob 35 will contact with the plate 19 of the cap 18 for serving as a stop to limit the rotary movement of the handle and inner chamber when swung for dispensing its contents. The handle 32 is positioned relative to the axial center of the inner chamber so that when the knob 35 is at the upper part of the outer chamber 10 the opening 31 will be in register with the inlet 15 of the outer chamber and with the mouth of the container. The stop 36 of the handle will then contact with the plate 19 of the cap 18 to limit the rotary movement of the inner chamber for accurately registering its opening 31 with the inlet of the outer chamber. By subsequently tilting the container part of its contents will pass through its mouth, through the registered inlet and outlet of the chambers into the inner chamber 25 which when proportioned of a determined size will accommodate the desired quantity of the contents from the container. When the handle is reversely swung so that the stop part 39 contacts with the plate 19 of the cap 18 the inner chamber with its contents will then be rotated for registering its opening 31 with the outlet 16 of the outer chamber, and the contents may then be dispensed from the inner chamber. The requirement for separating the stopper from the container is thus avoided, and by the use of the device the mouth of the container is always closed by the formation of the inner chamber against admitting moisture and dust when the contents are not being dispensed.

In the foregoing description, I have embodied the preferred form of my invention, but I do not wish to be understood as limiting myself thereto, as I am aware that modifications may be made therein without departing from the principle or sacrificing any of the advantages of this invention, therefore, I reserve to myself the right to make such changes as fairly fall within the scope thereof.

Having thus described my invention, I claim as new and desire to secure by Letters Patent:—

1. A measuring stopper for containers, comprising an outer chamber with an interiorly threaded cylindrical wall having an inlet and an outlet and having a wall closing one of its ends, an inner chamber of determined proportions having an end wall at the open end of the outer chamber and having an exteriorly threaded cylindrical wall screwed in the outer chamber, the cylindrical wall of the inner chamber having an opening registrable alternately with the inlet and outlet of the outer chamber when the inner chamber is partly rotated, a handle on the end wall of the inner chamber, provided with stops for limiting the rotary adjustments of the inner chamber when its opening registers with either the inlet or outlet of the outer chamber, and means on the outer chamber to allow of being removably fastened to a container so that its inlet registers with the mouth of the container.

2. A measuring stopper for containers, comprising an outer chamber with an interiorly threaded cylindrical wall having an inlet and an outlet and having a wall closing one of its ends, an inner chamber of determined proportions having an end wall and having an exteriorly threaded cylindrical wall screwed in the outer chamber, the cylindrical wall of the inner chamber having an opening registrable alternately with the inlet and outlet of the outer chamber when the inner chamber is partly rotated, a handle on one of the end walls of the inner chamber provided with stops for limiting the rotary adjustments of the inner chamber when its opening registers with either the inlet or outlet of the outer chamber, and an interiorly threaded annular cap on the outer chamber, having an opening registering with the inlet of said outer chamber.

3. In a measuring stopper for containers, an outer chamber with an interiorly threaded cylindrical wall having an inlet and an outlet, and a rotative inner chamber of determined proportions having end walls and having an exteriorly threaded cylindrical wall screwed in the outer chamber, the wall of the inner chamber having an opening registrable alternately with the inlet and outlet of the outer chamber when the inner chamber is partly rotated.

4. In a measuring stopper for containers, the combination with a threaded cap having an opening, of an outer chamber with an interiorly threaded cylindrical wall having an inlet communicating with the opening of the cap and having an outlet, and a rotative inner chamber of determined proportions having end walls and having an exteriorly threaded cylindrical wall screwed in the outer chamber, the wall of the inner chamber having an opening registrable alternately with the inlet and outlet of the outer chamber when the inner chamber is partly rotated.

5. In a measuring stopper for containers, the combination with a threaded cap having an opening, of an outer chamber with an interiorly threaded cylindrical wall having an inlet communicating with the opening of the cap and having an outlet, and also having a wall closing one of its ends, an inner chamber of determined proportions with an exteriorly threaded cylindrical wall screwed in the outer chamber and having an end wall at the open end of the outer chamber, the cylindrical wall of the inner chamber having an opening registrable alternately with the inlet and outlet of the outer chamber when the inner chamber is partly rotated, and a handle on the end wall of the inner chamber, having a protruding arm for limiting the rotary adjustments of the inner chamber when its opening registers with either the inlet or outlet of the outer chamber.

This specification signed this 13th day of August, A. D. 1923.

JOSEPH M. ANGELETTI.